(12) United States Patent
Brzozowski

(10) Patent No.: US 7,484,842 B2
(45) Date of Patent: Feb. 3, 2009

(54) CONFIGURABLE EYEWEAR

(76) Inventor: Frank T. Brzozowski, 2357 E. Dauphin St., Philadelphia, PA (US) 19125

( * ) Notice: Subject to any disclaimer, the term of this patent is extended or adjusted under 35 U.S.C. 154(b) by 429 days.

(21) Appl. No.: 10/648,508

(22) Filed: Aug. 25, 2003

(65) Prior Publication Data

US 2004/0046930 A1    Mar. 11, 2004

Related U.S. Application Data

(60) Provisional application No. 60/405,722, filed on Aug. 26, 2002.

(51) Int. Cl.
*G02C 5/00* (2006.01)
*G02C 1/00* (2006.01)

(52) U.S. Cl. .............. 351/41; 351/54; 351/61; 351/84; 351/86

(58) Field of Classification Search ............... 351/41, 351/54, 55, 61, 83–86, 154, 90–98, 49
See application file for complete search history.

(56) References Cited

U.S. PATENT DOCUMENTS

| | | | | |
|---|---|---|---|---|
| 1,401,327 A | * | 12/1921 | Erhard | 351/84 |
| 1,471,996 A | * | 10/1923 | Bailey | 351/84 |
| 1,585,489 A | | 5/1926 | Hailman | |
| 1,735,021 A | * | 11/1929 | Stewart | 351/84 |
| 2,285,615 A | | 6/1942 | Ruchser | |
| 2,813,459 A | * | 11/1957 | Archambault | 351/49 |
| D208,502 S | | 9/1967 | Halpern et al. | |
| 3,826,564 A | * | 7/1974 | Werling, Sr. | 351/45 |
| 3,958,867 A | | 5/1976 | Morgan | |
| 4,863,256 A | | 9/1989 | McDougald | |
| 4,948,244 A | | 8/1990 | Jones | |
| 4,998,815 A | * | 3/1991 | Lin | 351/106 |
| 5,459,534 A | * | 10/1995 | Morrison | 351/128 |
| 5,663,779 A | * | 9/1997 | Karasawa | 351/49 |
| 5,956,114 A | * | 9/1999 | Tassier | 351/41 |
| 6,227,666 B1 | * | 5/2001 | Hirschman | 351/95 |

FOREIGN PATENT DOCUMENTS

JP    7-159733    *  6/1995    ............. 351/54

* cited by examiner

*Primary Examiner*—Huy K Mai

(57) ABSTRACT

This is a configurable eyewear system that has at least one temple member, at least one lens, a pair of mating members, and a connector. The at least one temple member and the at least one lens are rotatably connected by coupling at least one first mating member and at least one second mating member with the connector. The invention also has at least one containment structure and at least one lens that is rotatable within the containment structure. The invention further includes an eyewear lens that has a rotator and an eyewear lens that has an anchor cut-out. In addition, the invention includes an eyewear lens, that has at least a first prescription, an interior side and an exterior side on flip sides of the lens, wherein the viewing effect of the first prescription exists from the interior side and from the exterior side.

19 Claims, 13 Drawing Sheets

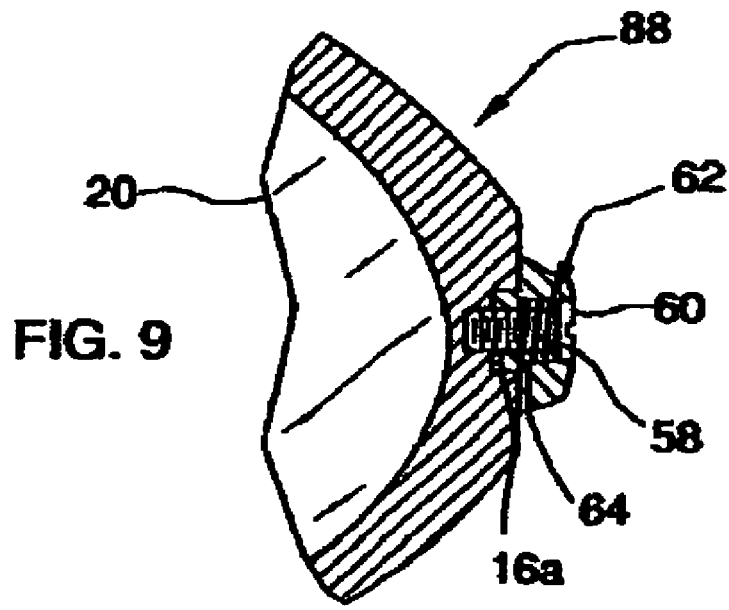
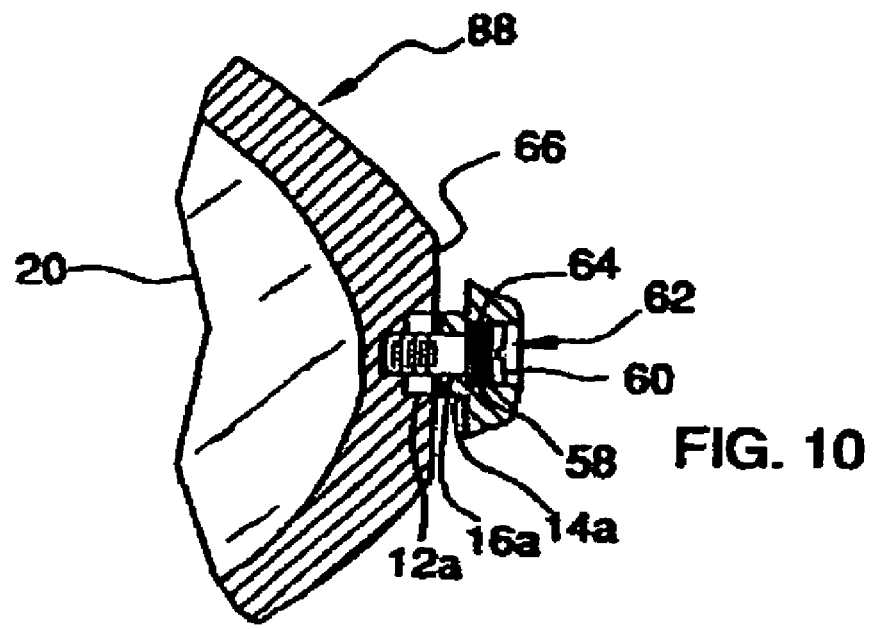

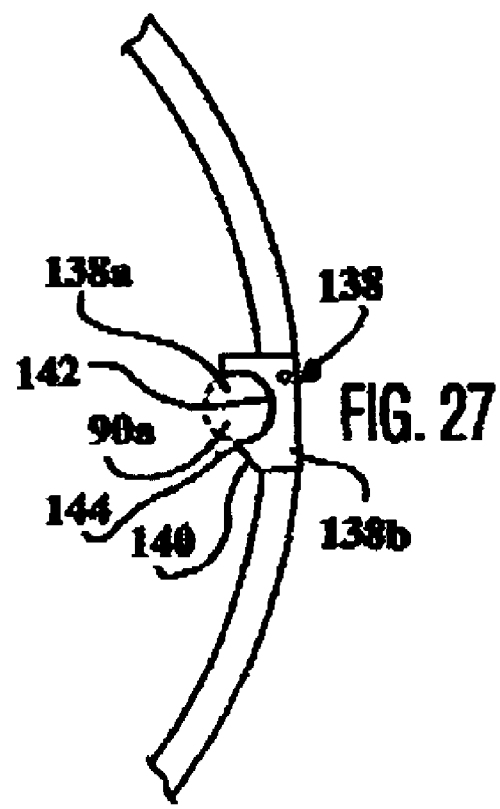
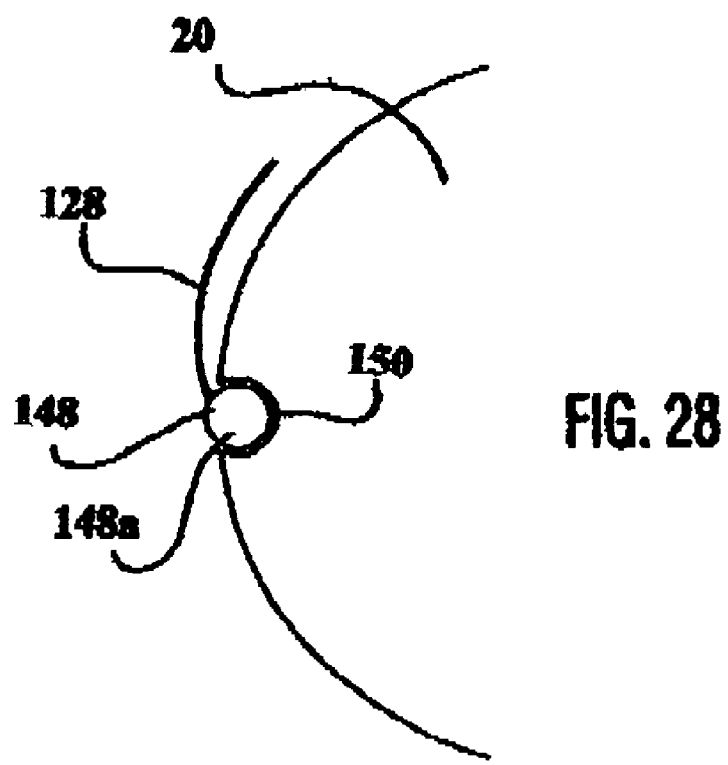

CONFIGURABLE EYEWEAR

CROSS-REFERENCE TO RELATED APPLICATION

This application claims the benefit of U.S. Provisional Application Ser. No. 60/405,722, filed on Aug. 26, 2002, entitled "Configurable Eyewear System," of Frank T. Brozozowski, and which is incorporated into this current application.

BACKGROUND OF THE INVENTION

While configurable eyewear is known in the art, the known configurable eyewear lacks the versatility and convenience of the current invention.

SUMMARY OF THE INVENTION

The invention includes a configurable eyewear system that has at least one temple member and at least one lens, at least one first mating member and at least one second mating member, at least one connector, whereby the at least one temple member and the at least one lens being are rotatably connected by coupling the at least one first mating member and said at least one second mating member with the connector.

The invention also includes an eyewear lens that has at least a first prescription, an interior side and an exterior side on flip sides of the lens, wherein the viewing effect of the first prescription exists the interior side and from the exterior side.

The invention is also a method of making a rotatable eyewear lens that has a first optical portion and a second optical portion wherein the first optical portion has a first prescription and the second optical portion has a second prescription, and the lens further has an interior side and an exterior side on flip sides of said lens. The method includes constructing the first prescription of the lens in manner whereby the viewing effect of the first prescription exists from the interior side and from the exterior side.

Also, the invention includes a configurable eyewear system that has at least one containment structure and at least one lens. The at least one lens is rotatable within the containment structure. The eyewear system further includes at least one rotator, and the at least one lens is rotatable at least by the rotator.

The invention further includes an eyewear lens that has a rotator and an eyewear lens that has an anchor cut-out.

BRIEF DESCRIPTION OF THE DRAWINGS

The accompanying drawings, which are incorporated in and form a part of the specification, illustrate the embodiments of the present invention and, together with the description serve to explain the principles of the invention.

FIGS. 9, 10, 11A, 11B, 12-18, 21-29, and 31 are partial perspective views of embodiments of the invention.

DETAILED DESCRIPTION OF THE PREFERRED EMBODIMENTS

Figure 1:
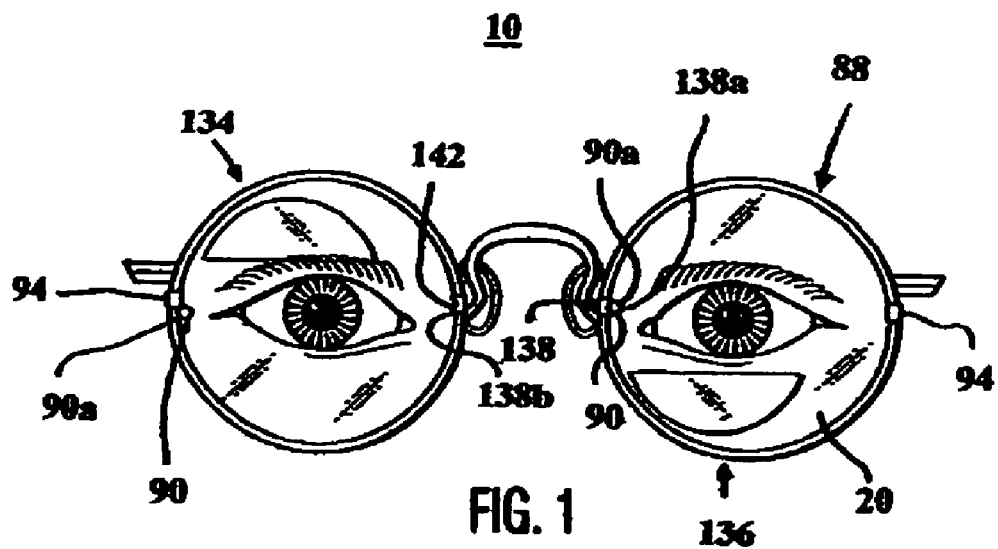
FIGS. 1, 2, 4, and 7 are front perspective views of embodiments of the invention.

With reference to the drawings, and in particular to FIGS. 1 through 31 thereof, new configurable eyewear systems 10, lenses 20 and methods 152 embodying the principles and concepts of the present invention are described.

The lenses 20 and eyewear 10 of the invention can be used in a headpiece. The terms headpiece and eyewear are intended to include all kinds of eyewear that can include lenses for the eyes. As such, the terms headpiece and eyewear are intended to include, but are not limited to eyeglasses, prescription eyeglasses, sunglasses, welder's eyewear, motorcycle rider eyewear, safety eyewear, skydiving eyewear, airplane pilot eyewear, deep sea diving eyewear, gas mask eyewear, hazardous materials eyewear, 3-d glasses, costumes, masks, goggles, hoods, UV tanning eyewear, racecar driver eyewear, astronaut eyewear, sports eyewear, and the like.

Headpieces and eyewear can have varying types of containment structures 88 to keep the lens affixed to the headpiece and eyewear. It is to be understood that the containment structure 88 may include, but is not limited to, at least one frame, rim, partial rim, supporting structure, temple member, nosepiece or any combination of these elements.

While the containment structure 88 could be a rim or frame, it also could be a structure into which the lens is placed in a manner whereby the lens is contained in the structure and does not easily fall out. By way of example, and for exemplary purposes only, the containment structure 88 could be found within eyewear that is in the form of a mask, helmet, hood or goggle. The containment structure 88 could be made of any material from which a lens is constructed. In addition, the containment structure 88 could be a continuation of the headpiece, or made of a totally separate material.

The embodiments of this invention include at least one lens 20. The lens may have at least two optical portions. If the lens has two optical portions, they may be designated as a first optical portion 84 and a second optical portion 86. If the lens has more than two optical portions, they would be designated as third, fourth, etc. optical portions. The system enables the wearer to configure the eyewear in at least two positions whereby the wearer is alternately able to look through the first and second optical portions.

The optical portions generally will be different from one another, thereby enabling the wearer to look through at least two optical portions while wearing one eyeglass or pair of eyeglasses. It is to be noted, however, that the first and second optical portions could be the same as one another. In addition, the optical portions merely are designated as first, second, etc. optical portions for explanatory purposes, in that they could be designated in any manner to identify two or more optical portions. Relating to the optical portions, the first optical portion 84 could be one prescription and the second optical portion 86 could be another prescription. The two prescriptions could simply be two different prescriptions. Alternatively, the first prescription 80 could be the primary prescription and the second prescription 82 could be a multi-focal prescription, such as a bi-focal, tri-focal, etc. Also, the first optical portion 84 could be clear, while the second optical portion 86 could be shaded. Alternatively, the first and second optical portions could both be shaded with the first and second optical portions having different shades. It is also possible that the first optical portion 84 could have one prescription, and the second optical portion 86 could be plain glass or plastic. Similarly, the first and second optical portions could be made of different materials; for example glass and plastic. In addition, the first optical portion 84 could be glass and the second optical portion 86 could have nothing in that part of the frame. It is also to be understood that the differences between the optical portions could be any combination of any of the elements set forth in the above listed elements. In addition it is to be understood that that the types of lenses in the optical portions are exemplary and that other combinations currently known or to be discovered in the future are intended to be included.

If there is a first optical portion 84 and a second optical portion 86, optionally the first optical portion 84 will be a majority of the lens, and the second optical portion 86 will be a minority of the lens. However, it is possible that the optical portions could be of equal size.

The second optical portion 86 can be a multi-focal lens. It is to be understood that the term multi-focal used herein is intended to include bifocals, tri-focals, quadra-focals, etc. As a result, the terms second optical portion and second prescription may include more than one optical portion and more than one prescription. For example, the second optical portion and the second prescription for a trifocal lens could include both the bifocal and tri-focal lens parts.

The more than one optical portions in the configurable eyewear can serve a variety of purposes, including, but not limited to, vision improvement, vision enhancement, vision convenience, shading, fashion and the like.

The lenses in the embodiments of the invention also may be described as being in a top position, bottom position, first position and second position. These terms are intended to mean the following: the top position is toward the top of the head of the user; the bottom position is toward the bottom of the head of the user; in the first position, the multi-focal is in the top position; and in the second position, the multi-focal is in bottom position. In addition while referring to the lens the terms interior side and exterior are used. The interior and exterior sides of a lens is the flip sides of the lens. In other words, the interior side is the flip side of the exterior side, and vice versa. When the lens is in a containment structure 88, the interior side is the side facing the wearer when the lens is in the first position, and exterior side is the side facing the wearer when the lens is in the second position. However if the lens is not in a containment structure 88, the interior side and exterior side simply refer to the opposite flip sides of the lens.

The term nosepiece is intended to include both nosepieces that are made of one structure and nosepieces that are made of a pair of structures.

For all of the combinations of lenses, the lenses can be made according to techniques currently known in the art or to be developed, including, but not limited to molding, injection molding, grinding, blowing, sanding and the like.

It is to be understood that the lenses of the eyewear described herein, in addition to the materials already listed, could be made of materials including, but not limited to, glass, plastic, tinted or shaded compounds.

The invention is described as having at least one lens 20. It is to be noted, however, that while the invention can be practiced with one lens 20, it also can be practiced with two or more lenses 20. FIGS. 1, 2, 4, and 7 illustrate the eyewear system 10 having two lenses 20.

Figure 4:
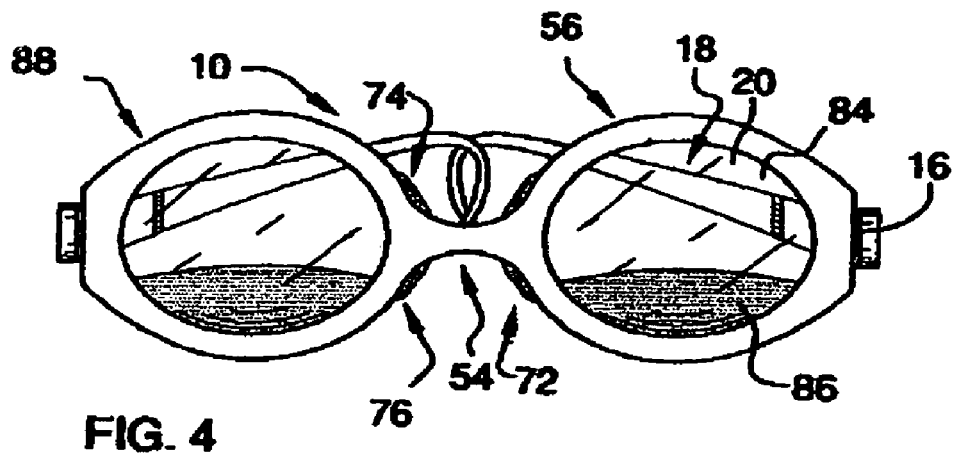
Figure 5:
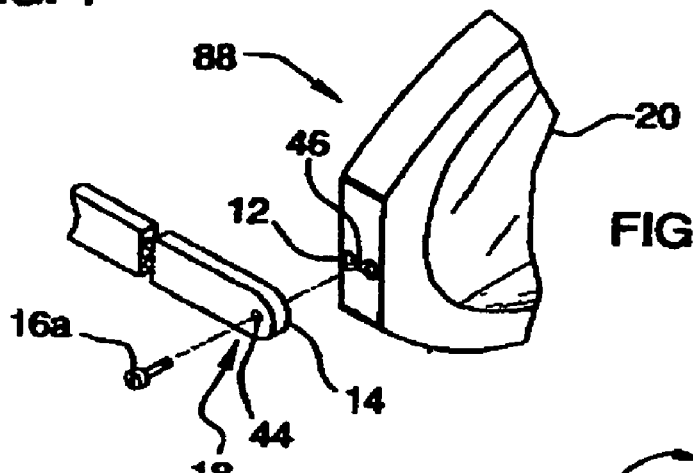
FIGS. 5, 19 and 20 are exploded partial perspective views of embodiments of the invention.
Figure 6:
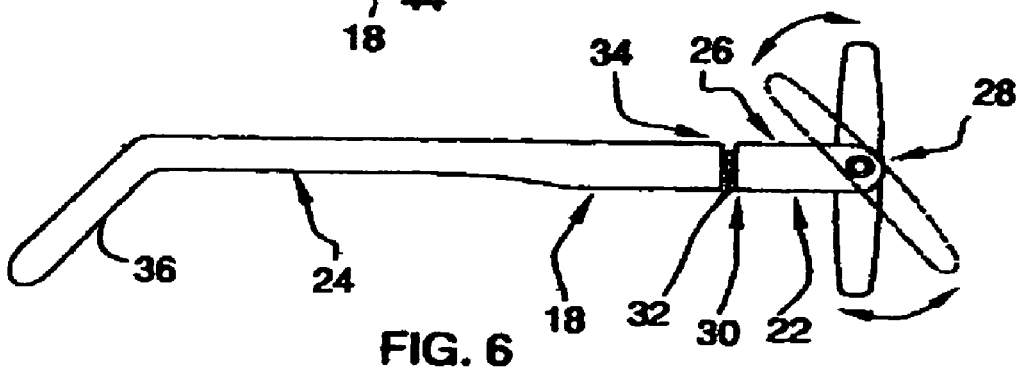

Reference is now made to FIGS. 4-11b, 18-20, and 31 that illustrate an embodiment of the configurable eyewear system 10 of the current invention. As seen in these Figures, the eyewear system 10 may include at least one lens 20 and at least one first mating member 12 and at least one second mating member 14. The eyewear system 10 further includes at least one connector 16, and at least one temple member 18, whereby the at least one temple member 18 and the at least one lens 20 are rotatably connected to each other by coupling the at least one first mating member 12 and the at least one second mating member 14 with the connector 16. As seen in FIGS. 4-10, 19 and 20, the eyewear system 10 can include at least one temple member 18 and at least one lens 20, contained in a containment structure 88. As seen in FIGS. 6 and 8, the at least one lens 20 rotates in relation to the at least one temple member 18 other along a first axis.

The at least one temple member 18 can include a first end 22 and a second end 24. The first end 22 further can include a butt-strap 26, which can have a front end 28 and a hinge end 30. The hinge end 30 attaches to a folding hinge 32. The second end 24 can include a hinge end 34, which is attached to the folding hinge 32, and an earpiece 36 for resting the temple piece on the ear of a user. As seen in FIGS. 4-8, the folding hinge 32 moves the second end 24 of the temple pieces inward to fold behind the lenses 20 along a second axis. Alternatively, the temple member 18 may be just one piece that extends from the front end to the ear of the wearer.

In all of the embodiments as illustrated in FIGS. 4-11b, and 18-20, the at least one lens 20 is able to rotate in relation to the temple member 18 between the first position and the second position in a manner whereby the interior side and the exterior side exchange places. In other words, the interior side is the flip side of the exterior side, and vice versa. For example, the interior side of the lens 20 can face the face of the user and it can rotate to face outward. Likewise, the exterior side of the lens 20 can face the face of the user and it can rotate to face outward. In addition, when the at least one lens 20 rotates, the first prescription 80 rotates between top position and the bottom position, and the second prescription 82 rotates between the top position and the bottom position.

Specifically referring to FIGS. 4-6 and 18-20, the at least one first mating member 12 includes at least one concave coupler 38 and the at least one second mating member 14 includes at least one convex coupler 40. Alternatively, the first and second mating members could be two surfaces 42 in relative parallel orientation to one another.

Figure 18:
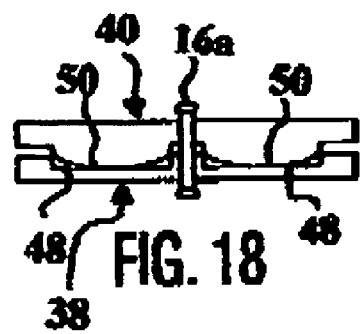

The first and second mating members are rotatably connected, clockwise and/or counterclockwise, by at least one connector 16. The connector 16 can be a connector piece 16a. As seen in FIG. 18, the connector piece 16a is a rivet. It is to be understood that the connector piece 16a also could be any connector piece 16a currently known or to be invented, including, but not limited to, a bolt, hinge, screw, rotating hinge, pivot hinge, central swivel hinge, carriage bolt and the like.

Figure 7:
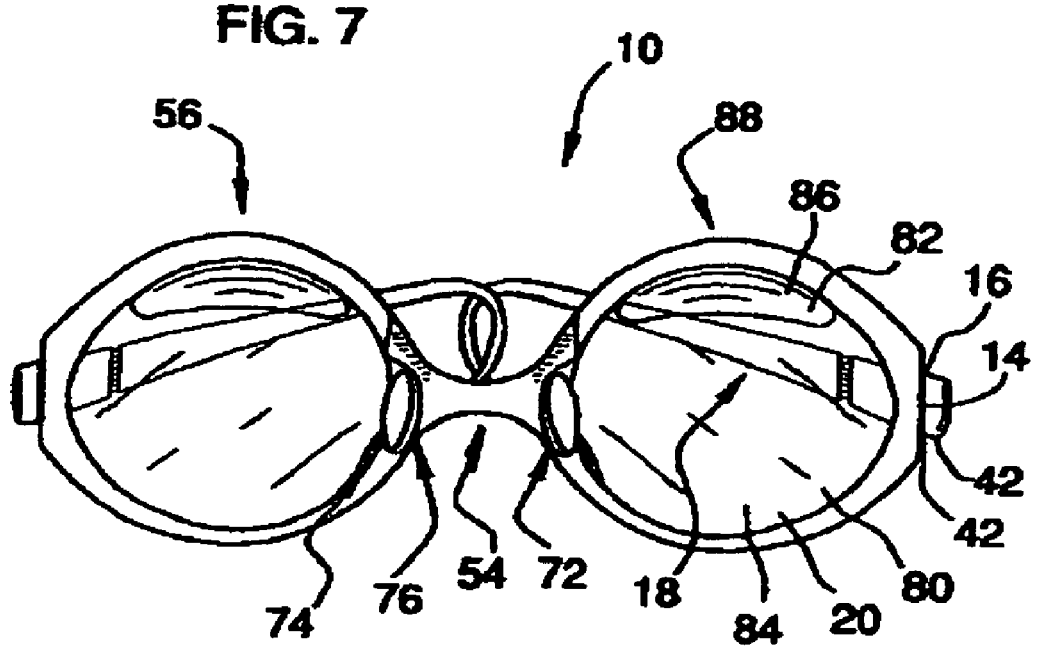
Figure 8:
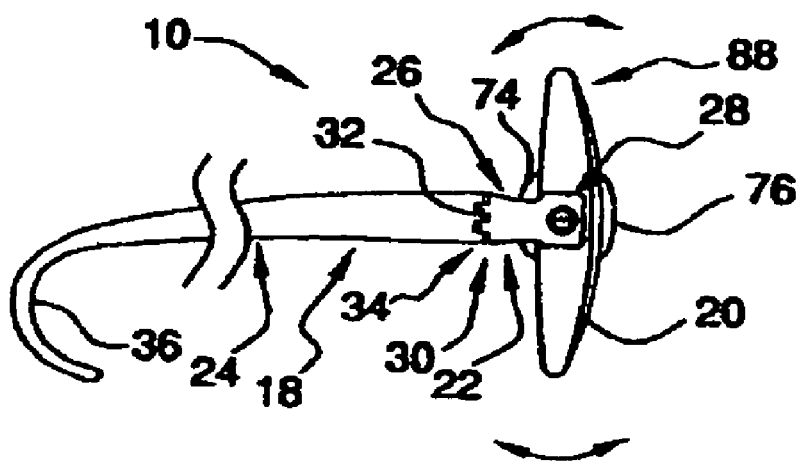

As seen in FIG. 7, the connector could be two surfaces 42 that are attracted to each other, such as, but limited to, a magnet and a substance attracted to a magnet, the two hook and loop surfaces that comprise the material known as Velcro®, and the like.

The connector piece 16a can be connected to the temple member 18 by inserting the piece at a connector opening 44, and the piece can be connected to the frame by inserting the piece into a connector opening 46. The connector opening may transect the temple member 18, as seen in FIGS. 5 and 6. It is to be understood, however, that the connector opening may only partially transect the temple member 18 or the frame.

Figure 19:
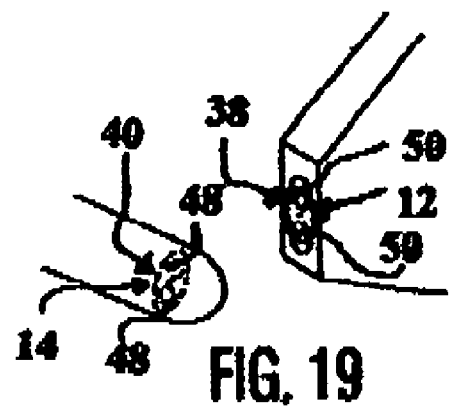

As seen in FIG. 19, the at least one convex coupler 40 is comprised of at least two convex portions 48 and the at least one concave coupler 38 is comprised of at least two concave portions 50. It is to be noted that as it discretionary whether the frame or the temple member 18 have the convex portion or the concave portion, as long as the frame and temple member 18 each have the complimentary portion of each other.

Figure 20:
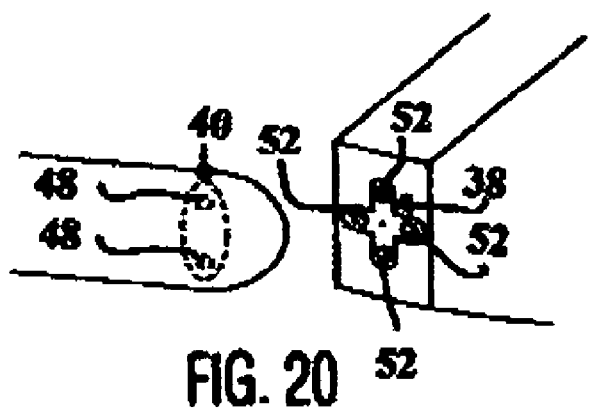

Referring now to FIG. 20, the at least one convex coupler 40 is comprised of two convex portions 48 and the at least one concave coupler 38 is comprised of four concave portions 52. However, it is to be understood that the opposite configuration is possible, in that the convex coupler 40 could have four portions and the concave coupler 38 could have two portions.

The at least one lens 20 is rotated in this embodiment by placing pressure on the lens 20 to rotate it in either a clockwise or counterclockwise direction. The pressure causes the mating members to separate. The frame surrounding the lens, and the lens 20, rotate until the convex and concave portions are aligned again. When the mating members are aligned, the convex portion interacts with the concave portion causing the lens 20 and temple member 18 to remain in a fixed position until pressure is again exerted to cause the mating members to separate. As seen in FIGS. 4 and 7, when there are two lenses 20, they can be attached by the nose-bridge portion 54 of the frame 56. As a result, the two lenses 20 and the frame 56 rotate as a unit in relation to the two temple members 18. It is to be understood, however, that each lens 20 could rotate in relation to the temple member 18 independent of the other lens 20.

Reference is now made to FIGS. 9-11b, which illustrate an embodiment of the invention that utilizes a compression member 58. In this embodiment, the connector piece 16a further includes a compression head 60 and the temple member 18 further includes a compression cavity 62. The compression cavity 62 has an outer surface 64, and the compression member 58 is compressible between the compression head 60 and the outer surface 64 of the compression cavity.

The compression member 58 may be a spring or any other device currently known in the art or to be discovered that is compressible, and when compressed, exerts outward pressure.

In this embodiment, the first mating member 12a on the rim is in the form of a rim cavity 12a and the second mating 14a member on the earpiece 36 is in the form of a peg-like protrusion 14a. When the at least one lens 20 is locked into place, the peg-like protrusion 14a rests in the rim cavity 12a. The outward pressure exerted by the compression member 58, keeps the peg-like protrusion 14a in the rim cavity 12a. When the at least one lens 20 is rotated, the temple member 18 is pulled away from the rim, thereby compressing the compression member 58. The peg-like protrusion 14a then can be pulled out of the rim cavity 12a. The connector piece 16a is positioned so that when the compression member 58 is compressed, the peg-like protrusion 14a may be pulled outward to a point whereby it clears the exterior surface 66 of the rim, and leaves a space between the peg-like protrusion 14a and the rim. As a result, the at least one lens 20 may be rotated, while the temple member 18 remains fixed.

When the at least one lens 20 is rotated 180 or 360 degrees, the outward pressure on the earpiece 36 may be released and the peg-like protrusion 14a is enabled to mate with the rim cavity 12a. At this point, the compression member 58 is exerts outward pressure between the compression head 60 and the outer surface 64 of the compression cavity 62, thereby keeping the peg-like protrusion 14a inserted in the rim cavity 12a.

Figure 11A:
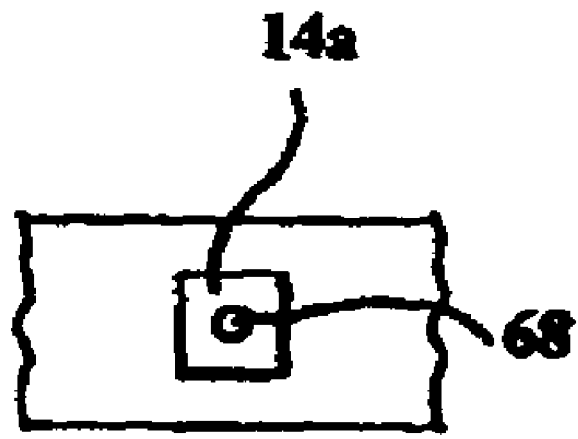
Figure 11B:
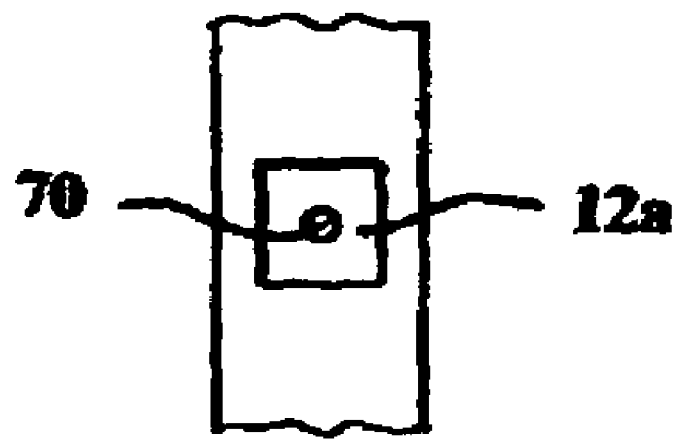

As seen in FIGS. 11a and 11b, the first mating member 12 is rectangularly shaped and the second mating member 14 is rectangularly shaped. Specifically, in these Figures, the rectangular shape is that of a square. It is to be noted that other rectangular shapes also may be used, as long as the peg-like protrusion 14a and the cavity 12a are of complimentary shapes so that the peg-like protrusion 14a fits into the rim cavity 12a. When the rectangular shapes are that of a square, the at least one lens 20 may be rotated and locked to the temple member 18 at 90, 180, 270 and 360 degree angles.

When the rectangular shapes are not that of a square, the at least one lens 20 may be rotated and locked to the temple member 18 generally at 180 and 360 degree angles. It is to be noted that other complimentary shapes could also be used, such as but not limited to, a triangle and a star and the like.

The connector piece 16a illustrated in this embodiment is a screw, and the compression head 60 is the head of the screw. It is to be understood, however, that any connector piece known in the art or to be discovered may used, as long as the connector piece has a compression head 60 that is at least a wide as the compression member 58.

In this embodiment, the connector piece 16a passes through a connector hole 68 in the connector cavity of the temple member 18. It is also inserted into a connector opening 70 in the rim cavity 12a. When the connector piece 16a is a screw, it is threaded into the connector opening 70 in the rim. However, it would be possible to keep the connector piece in place by other manners known or to be discovered in the art. For exemplary purposes only and not intended to be limiting, the connector piece could use a flange that is molded into the rim, or the piece could be held in place my means of glue, adhesive, Velcro®, epoxy, and the like.

In addition, it would be possible to omit the connector piece 16a and the compression member 58 in this embodiment, and in its place use two substances that are attracted to each other as the connector 16. In this embodiment, one of the substances would be affixed to the rim cavity 12a and the complimentary substance would be affixed to the peg-like protrusion 14a. The complimentary substances could include, but are not limited to, a magnet and a substance attracted to a magnet, hook and loop material known as Velcro® and the like. In the case of a magnet, the rim or the temple member 18 could be made of a substance that attracts a magnet rather than having the substance affixed thereto.

The eyewear system 10 optionally can have at least one nosepiece 72. As illustrated in FIGS. 4, 7, and 8 the eyewear system 10 can have two nosepieces; a first nosepiece 74 for use when the eyewear system 10 is in the first position and the second nosepiece 76 when the eyewear system 10 is rotated to the second position. The nosepieces may be positioned in any manner whereby the eyewear fits on the face of the user when the eyewear is in the first or second position.

In FIG. 4, the first nosepiece 74 is down and the second nosepiece 76 is up when the eyewear is in the first position, and when the eyewear system 10 is rotated to the second position, the second nosepiece 76 is down and the first nosepiece 74 is up.

In FIGS. 7 and 8, the first nosepiece 74 is facing the face of the user and the second nosepiece 76 is facing outward when the eyewear is in the first position, and when the eyewear system 10 is rotated to the second position, the second nosepiece 76 is facing the face of the user and the first nosepiece 74 is facing outward.

In these embodiments, the eyewear system 10 could be made whereby one nosepiece is more prominent than the other. It would be possible to make the eyewear system 10 whereby the more prominent nosepiece is in use when the more prominent lens position is in place. For example, if the second position of the eyewear system 10 is when the multi-focal is down, then the more prominent eyewear position might be when the multi-focal is up. In that manner, the user could look through the eyewear system 10 utilizing the main prescription, and only rotate the eyewear system 10 to look through the multi-focal when needed. In this situation, as illustrated in FIGS. 7 and 8, the more prominent nosepiece 74 would be facing the face of the user when the multi-focal is in the up position. Generally the more prominent nosepiece 74 will enable a more secure and/or comfortable fit on the face of the user. Conversely, the less prominent nosepiece 76 would be facing the face of the user when the multi-focal is in the down position. As a result, when the multi-focal is in the up position, which generally would be the most used wearing position, the nosepiece that is facing outward is the less prominent nosepiece 76. Ultimately, the wearer of the eyewear system can have a nosepiece for use of the eyewear in both the first and second position, while esthetically, the nosepiece that is outfacing most of the time will be minimally noticeable.

Figure 31:
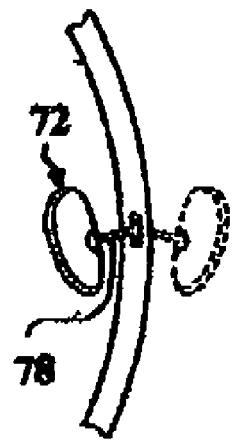

As seen in FIG. 31, the nosepiece 72 could rotate when the lenses 20 are rotated from the first and second position. The nosepiece 72 in this embodiment would have a moveable connector 78 attached to the lens 20 or the rim and also attached to the nosepiece pad. When the lenses 20 are rotated, the nosepieces could also be rotated on the connector 78. In FIG. 31, the connector is a small hinge, however, other connectors known or to be discovered in the art could be used, including, but not limited to, loop around a cord, a protrusion in a channel, a pliable material, and the like.

For all of the foregoing embodiments, the at least one lens 20 can be constructed so that the viewing effect of the first prescription 80 exists when viewed from said interior side and from said exterior side. When the lens 20 is viewed from the interior side outward the viewer views through the first prescription 80. When the lens 20 is flipped to the flip side, which is call herein, the exterior side, when the viewer views from the exterior side outward, the viewer still is able to view through the first prescription 80. In other words, the vision correction that is created by the first prescription 80 occurs when the viewer views through the lens 20 from either side; the viewer can view through the lens 20 from one side and then flip the lens 20 over and view through the lens 20 from the other side, and from both sides the viewer has the viewing correction of the first prescription.

In addition, the eyewear system 10 can be constructed so that when the lens 20 is in the first position, the interior side faces the face of the user and the second prescription 82 is in the top position and is attached to the interior side. When the at least one lens 20 is rotated the lens 20 is in the second position. When the lens 20 is in the second position, the interior side faces away from the face of the user, and the second prescription 82 is located at the bottom position facing away from the face of the user. As seen in FIGS. 4 and 7, when the first prescription 80 takes up a majority of the lens 20 and the second prescription 82 takes up a minority of the lens 20.

When the second prescription 82 is a located toward the edge of the lens 20, the rotation of the lens 20 can be a helpful for the viewing needs of the user. As seen in FIG. 7, when the lens 20 is in the first position, the user can view through the first prescription 80, while the second prescription 82 is on the top of the lens 20 and out of the normal viewing area of the user. When the lens 20 is rotated to the second position, as seen in FIG. 4, since the first prescription 80 is a majority of the lens 20, the viewer can still view through the first prescription 80 and have the viewing benefits of that prescription. However, when the lens 20 is in the second position, the second prescription 82 is at the bottom of the lens 20. The viewer can easily access the second prescription 82 and gain the benefits of that prescription by glancing downward. In this regard, when the second prescription 82 is a multi-focal prescription, the user can glance downward through the second prescription 82 to perform tasks which often require a bi or tri-focal, such as, but not limited to, reading or sewing. In FIG. 4, the second optical portion 86 is shaded. However, it is to be noted that a wide variety of combinations of lenses 20 may be used in the first and second optical portions, as set forth in the beginning of this section.

While FIGS. 4-8 illustrate at least one lens 20 in a containment structure 88, another embodiment of the invention is an eyewear lens 20 itself. In these embodiments the lens 20 can have at least a first prescription 80, and the lens 20 further can have having an interior side and an exterior side. The lens 20 can be constructed so that the viewing effect of the first prescription 80 exists when viewed from the interior side and from the exterior side. When the lens 20 is viewed from the interior side outward, the viewer views through the first prescription 80. When the lens is flipped to the flip side, which is called the exterior side, when the viewer views from the exterior side outward, the viewer still is able to view through the first prescription 80. In other words, the vision correction that is created by the first prescription 80 occurs when the viewer views through the lens 20 from either side; the viewer can view through the lens 20 from one side and then flip the lens 20 over and view through the lens 20 from the other side, and from both sides the viewer has the viewing correction of the first prescription 80.

Specifically seen in FIGS. 4 and 7, the lens 20 can have both a first optical portion 84 having a first prescription 80 and a second optical portion 86 having a second prescription 82. Optionally, the first prescription 80 can be a majority of the lens 20 and the second prescription optionally can be a minority of the lens 20. In addition, optionally, the second prescription 82 can be a multi-focal.

To construct the at least one eyewear lens 20 that has at least a first optical portion 84 and a second optical portion 86, wherein the first optical portion 84 has a first prescription 80, and the second optical portion 86 has a second prescription 82, the lens 20 is first constructed to the specifications of the first prescription 80.

The lens 20 can be constructed so that the viewing effect of the first prescription 80 exists when viewed from the interior side and from the exterior side. When the lens 20 is view from the interior side outward, the viewer views through the first prescription 80. When the lens 20 is flipped to the flip side, which is called the exterior side, when the viewer views from the exterior side outward, the viewer still is able to view through the first prescription 80. In other words, the vision correction that is created by the first prescription 80 occurs when the viewer views through the lens 20 from either side; the viewer can view through the lens 20 from one side and then flip the lens 20 over and view through the lens from the other side, and from both sides the viewer has the viewing correction of the first prescription 80.

Next the second optical portion 86 can be constructed on the lens 20. The second optical portion 86 optionally can be a second prescription 82.

In one embodiment, the first prescription 80 has an interior side and an exterior side. The interior side can have a top portion and a bottom portion, and the second prescription 82 is attached to the top portion of the interior side. The at least one lens 20 is rotatable, whereby upon rotation, the interior side rotates from facing the face of the user to facing away from the face of the user, the top portion rotates to the bottom position, and the second prescription 82 is at the bottom position facing away from the face of the user. The second prescription 82 could be a variety of prescriptions, including, but not limited to, a multi-focal lens.

Reference is now made to FIGS. 1-3, 12-17, and 21-29, which illustrate embodiments of the invention whereby the at least one lens 20 of the eyewear system 10 is configured by rotating the lens 20 within a containment structure 88. The term containment structure is described in the beginning of this section. If the containment structure 88 is a rim, it generally surrounds all or a portion of the peripheral portion of the lens.

The lens 20 may be rotated in either a clockwise or counterclockwise direction by a rotator 90. The rotator could be a turning member 90a, and it could also be any means for rotating a lens 20, including, but not limited to the pressure exerted by fingers grasping the lens 20.

Specifically referring to FIGS. 2, 3, and 12-14, an embodiment of the invention is illustrated in which the at least one lens 20 further includes at least one turning member 90a, which is attached to the peripheral area 92 of the lens 20. The turning member 90a may be attached to the lens 20 by means known in the art or to be discovered, which may include, but is not limited to, glue, molding, tape, epoxy, Velcro®, fusion, magnets and the like. The user can grab the turning member 90a and rotate the lens either clockwise or counter clockwise within the containment structure 88.

Figure 2:
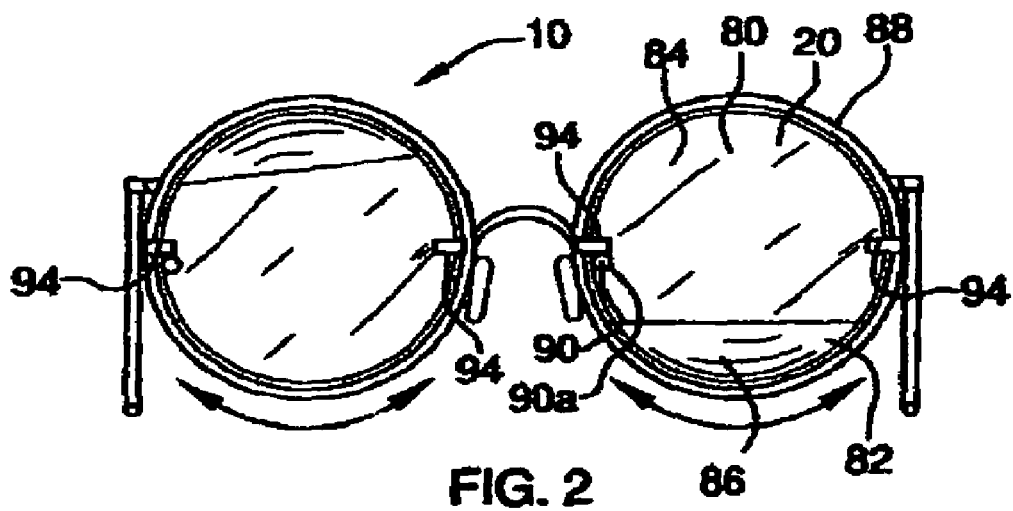
Figure 3:
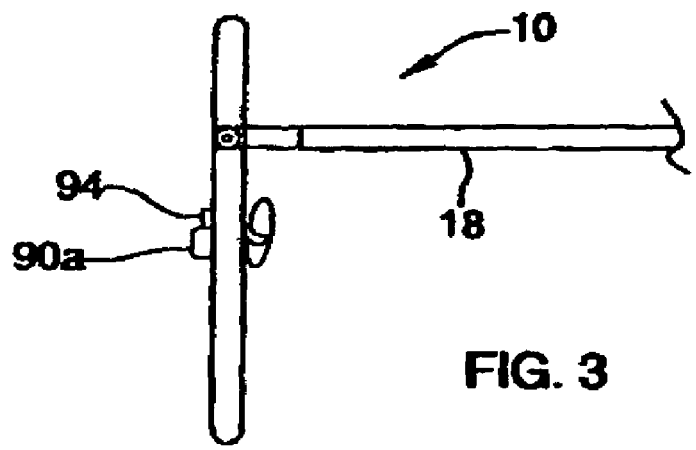
FIGS. 3, 6, and 8 are side perspective views of embodiments of the invention.

As seen in FIGS. 2 and 3, the eyewear system 10 can have at least one containment stop member 94 on the containment structure 88 that is able to impact the turning member 90a to prevent the turning member 90a from turning past the stop member 94. In the embodiment illustrated in FIG. 2, each lens has two stop members 94. The stop members 94 are located generally opposite one another on the containment structure 88, so that the lenses 20 can be rotated only approximately 180 degrees. As a result, when the lenses 20 are rotated, the portion of the lens 20 on the top of the rim goes to the bottom of the rim and the portion of the lens 20 on the bottom of the rim goes to the top of the rim. If the first optical portion 84 is substantially on the bottom of the rim and the second optical portion 86 is generally on the top of the rim, when the at least one lens 20 is rotated the second optical portion 86 will rotate to the bottom of the rim and the first optical portion 84 will rotate to the top of the rim. More specifically, if the first optical portion 84 is the first prescription 80 and the second optical portion 86 is a bifocal or trifocal, the bifocal can be in the up position when not in use, and by turning the turning member 90a, the bifocal or trifocal can be turned to the down position when in use. It is to be understood that this embodiment is not intended to be limited to the use of bifocals and or trifocals only.

When the eyewear system 10 utilizes two lenses 20, the system also can be made so that both of the turning members 90a are resting at the stop members 94 near the nose of the wearer when the second optical portion 86 is in the down position, and are resting at the stop members 94 near the temple members 18 when the second optical portion 86 is in the up position. It is to be understood that the opposite configuration also could be used. Also, it is possible to make the system where both of the turning members 90a are resting at the stop members 94 to the left when the second optical portion 86 is in the down position, and are resting at the stop members 94 to the right when the second optical portion 86 is in the up position. It is to be understood that the system could also be made in the opposite manner.

Figure 12:
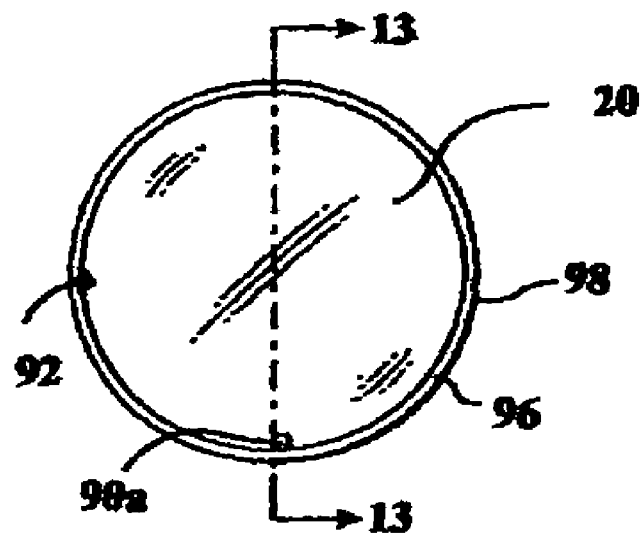
Figure 13:
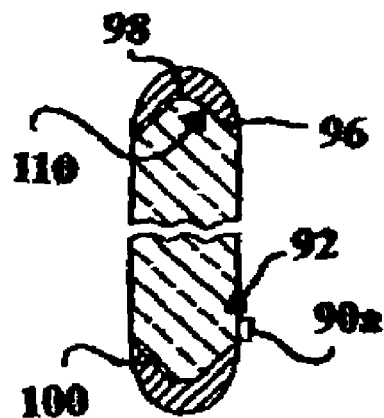
Figure 14:
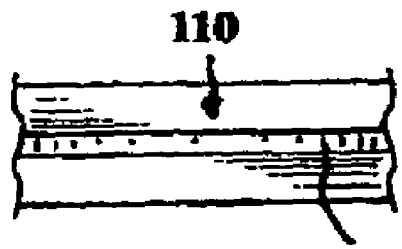

Reference is now made to FIGS. 12-14, which illustrate the inclusion of an outward bezel 96 at the peripheral edge 98 of the lens 20. In addition, the system can include a corresponding optional inward groove 100 at the interior surface 110 of the containment structure 88. The containment structure groove 100 and the lens bezel 96 can mate with each other to create a fit between the groove and the lens, in which the lens 20 may rotate.

It is to be understood that the lens 20 also can rotate within the containment structure interior surface 110 if a containment structure grove is not included.

FIGS. 15a-17 illustrate an embodiment of the invention in which a peripheral member 112 engages at least a portion of the peripheral edge 98 of the lens. The peripheral member 112 is attached to at least one projecting member 114, which is the turning member 90a of the lens 20. The projection member 114 can be a knob or any other device that can be accessed by the user to rotate the lens 20.

Figure 15A:
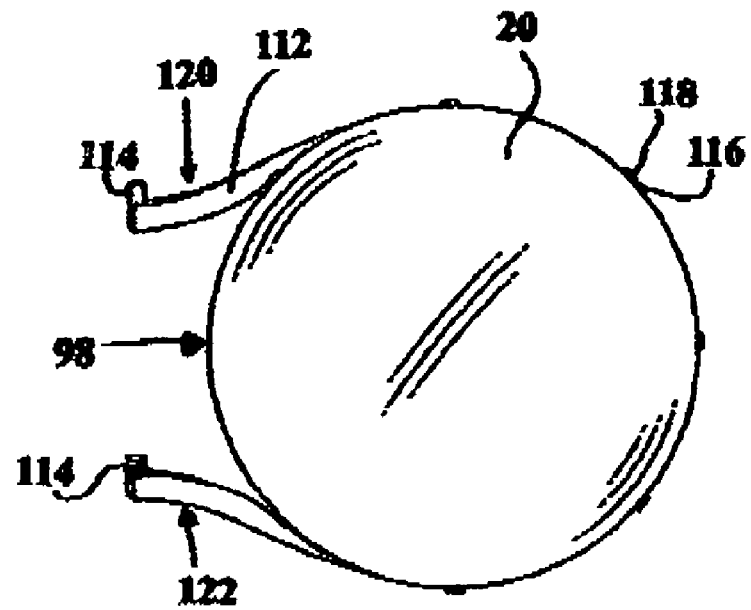
Figure 15B:
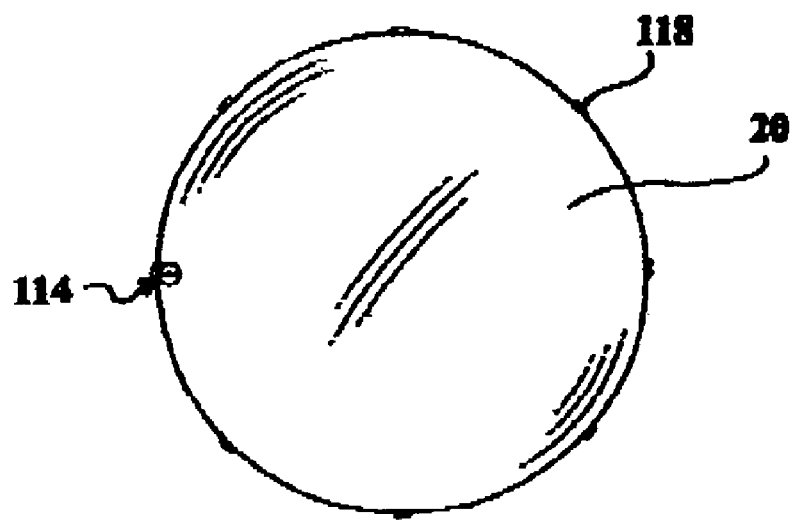
Figure 16:
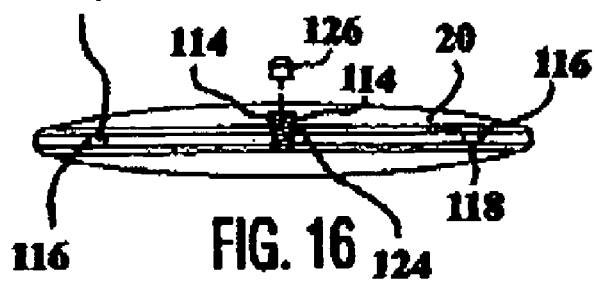

The peripheral member 112 may have at least one first mating member 116 and the peripheral edge 98 can have at least one second mating member 118. The at least one first and second mating members are positioned to intersect, thereby keeping the peripheral member 112 in communication with the lens 20 while rotating the lens 20. As seen in FIGS. 15a-16, the mating members are a plurality of openings 116 or indentations and corresponding prongs 118. While in these Figures the peripheral edge 98 has at least one prong 118 and the peripheral member 112 has at least one opening 116, it is to be understood that the peripheral member 112 could have at least one prong 118 and the peripheral edge 98 could have at least one opening 116 or indentation. In addition, optionally, the peripheral edge 98 could have a groove into which the peripheral member 112 could be placed.

The peripheral member 112 may have two ends, a first end 120 and a second end 122, which meet when the peripheral member 112 is placed around the peripheral edge 98 of the lens 20. In this embodiment, the peripheral member 112 functions as a belt. The first end 120 can have a first projecting member 114 and the second end 122 can have a second projecting member 114. As seen in FIGS. 15a-16, the first and second projecting members are generally in perpendicular relation to the belt. When the first and second end members meet, they form a turning member 90a. FIGS. 15a and 16 illustrate first and second projecting members that are each a semi-circular member optionally having threads 124 applied on the exterior arcuate surface. When the two semi-circular members meet, they form a circular knob, over which a circular cap 126 can be placed. A circular cap 126 with interior threads can be threaded over a knob having threads 124. Alternatively, the first and second end members may form a variety of shaped knobs, such as a triangle, rectangle, etc., over which a complimentary shaped cap 126 may be placed or over which a cap 126 that conforms to the shape of the knob may be placed. It is to be noted that the shapes and interactions of the first and second projecting members illustrated are exemplary; any interaction of forms known or to be discovered may function as the first and second projecting members described.

Figure 17:
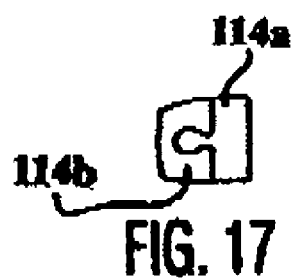

Threading the cap 126 on the semi-circular members keeps the first and second ends together, and keeps the peripheral member 112 on the peripheral edge 98 of the lens 20. As seen in FIG. 17, the first projecting member 114a may be in a tongue form and the second projecting member 114b may be in a groove form, whereby the first and second ends are connected in a tongue and groove fashion.

The lens-peripheral member assembly may be placed in a rim. The connected first and second projecting members may be manually manipulated as a turning member 90a to rotate the lens 20 within the rim.

When the peripheral member 112 is circular, generally the peripheral member 112 will be stretchy to be placed around the lens 20. When the peripheral member 112 is a belt, generally it will be flexible or curved to fit around the lens 20.

While the Figures show a peripheral member 112 that surrounds the peripheral edge 98, it would be possible to include a peripheral member 112 that engages only a portion of the peripheral edge 98, and which could be held in place by complimentary mating members, glue, adhesive, Velcro®, magnets, and the like. In this case, the peripheral member 112 might have only one projecting member that would function as the turning member 90a.

Reference is now made to FIGS. 1 and 21-29, which illustrate an embodiment of the invention wherein the eyewear system 10 includes a memory member 128 that is connected to the lens 20. The memory member 128 is able to be in a resting configuration 130 and in at least one stretched configuration 132 when the at least one lens 20 is rotated. The memory member 128 can be made of any material currently known or to be discovered that has a memory. A memory generally is known as matter that has one resting configuration 130 that can be changed to a second stretched configuration 132, and then remembers or returns to the first resting configuration 130. Currently known materials with memories include, but are not limited to, elastic, rubber, metals, springs and the like.

Generally the memory member 128 automatically returns to the original resting configuration 130 when energy is not exerted to keep it in the second stretched configuration 132. The stretched configuration 132 can be stretching such as in elastic or rubber, or can be stretched by elongation, such as in a spring. Also it could be a metal that stretches by expanding or contracting in response to temperature. It is to be understood that these examples of memory materials are not exhaustive, but are merely intended to be exemplary. It is to be understood that all memory materials that are currently known or to be discovered are intended to be included.

Figure 21:
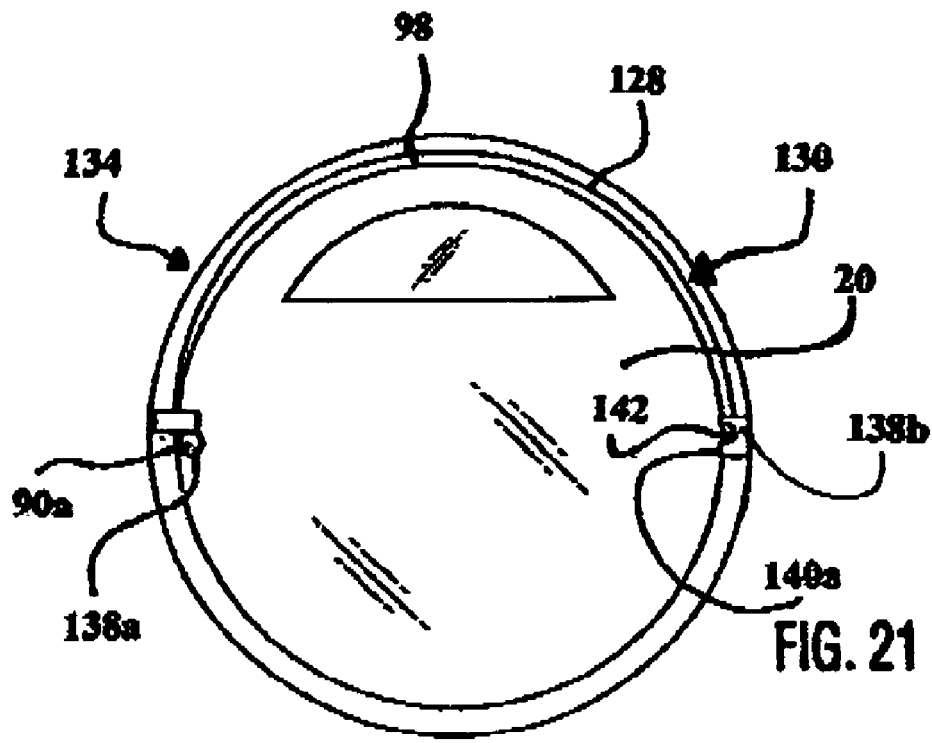

As seen in the embodiment illustrated in FIG. 21 the memory member 128 is in the original non-stretched resting configuration 130. As seen in the embodiment illustrated in FIG. 22 the memory member 128 is in the second stretched configuration 132. When the memory member 128 is in the resting configuration 130 and the at least one lens 20 is at the at rest position 134, and the memory member 128 is not stretched. Then, when the lens 20 is rotated, the memory member 128 is stretched. The memory member 128 stays stretched as long as energy is exerted on the lens 20 to maintain the rotated position 136 or the lens 20 is latched into the rotated position. When the energy is no longer exerted to keep the lens 20 in the rotated position 136 or when the lens 20 is unlatched from the rotated position 136, the memory member 128 automatically transforms from a stretched configuration 132 to the resting configuration 130, which causes the lens 20 to automatically rotate to the at rest position 134.

As most clearly seen in FIG. 21, the at least one lens 20 has a peripheral edge 98, and the memory member 128 surrounds less than the whole peripheral edge 98 when the memory member 128 is in the resting configuration 130.

Figure 22:
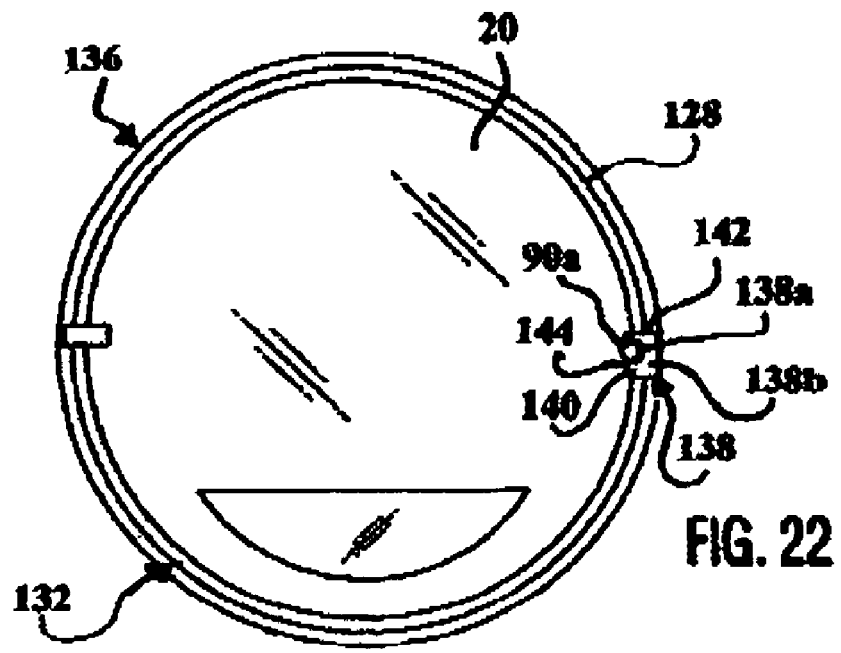
Figure 23:
Figure 24:
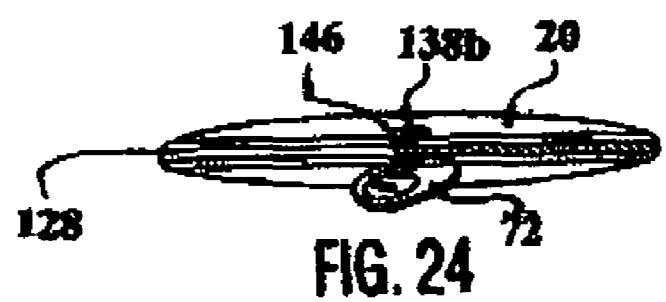

As most clearly seen in FIGS. 21 and 22, the at least one lens 20 has at least one latch 138, which is not latched when the memory member 128 is in the resting configuration 130. However, the at least one lens 20 is rotatable to enable the latch 138 to latch. When the lens 20 is rotated to enable the latch 138 to latch, the memory member 128 transforms to being in a stretched configuration.

The latch 138 can include a first latching member 138a and a second latching member 138b. The first latching member 138a can be attached to the front periphery of the lens. The first latching member 138a can also be the turning member. The second latching member 138b can be attached to the containment structure 88. As seen in FIG. 21, the first latching member 138a does not interact with the second latching member 138b when the memory member 128 is in the resting configuration 130. As seen in FIG. 22, the first latching member 138a is rotatable to impact with the second latching member 138b, which causes the memory member 128 to be stretched into a continuum of stretched configurations when the first latching member 138a is rotated toward the second latching member 138b. The memory member 128 can be stretched whereby the first latching member 138a is latchable with the second latching member 138b.

When the first latching member 138a impacts the second latching member 138b in a latched position, the at least one lens 20 is in a fixed position and the memory member 128 is in a stretched position.

As seen in FIGS. 22 and 27, the second latching member 138b can have a diagonal portion 140, and a curved cut-out portion 142. The first latching member 138a, which can be curved, can impact the diagonal portion 140, and by means of energy exerted, be pushed into the cut-out portion 142. The first latching member 138a is held in place by the lip 144 of the second latching member 138b. Energy must be exerted on the first latching member 138a, pushing it slightly outward and downward to unlatch the latch 138. Alternately, as seen in FIGS. 1 and 21, the diagonal portion may be omitted, with the second latching member 138b having a vertical portion 140a.

Since the memory member 128 has a memory, the memory automatically rotates the lens 20 into the at rest position 134 when the first latching member 138a and second latching member 138b are unlatched.

It is intended that any type of latch 138 currently known or to be discovered may be used with this invention. Other types of latches could include, but are not limited to a wire and post, a magnet and a material attracted by a magnet, hook and loop material known as Velcro®, a clip and the like.

Figure 25:
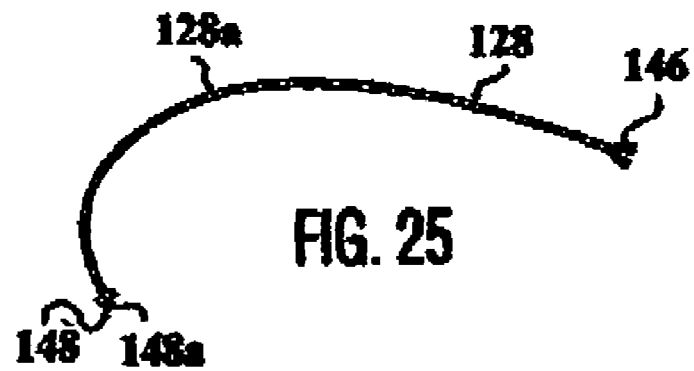

As seen in FIG. 25, in one embodiment of the memory member 128, the memory member can be an elastic material 128a that has a connector wire 146 on one end and an anchor end 148 on the other end. The anchor end could be an anchor insert 148a, which could be a wider portion of the elastic, or it could be a piece of another material. The elastic material 128a can be connected to the connector wire 146 and anchor end by a number of ways known in the art or to be discovered, such as crimping, gluing, heat sealing, molding and the like.

Figure 26:
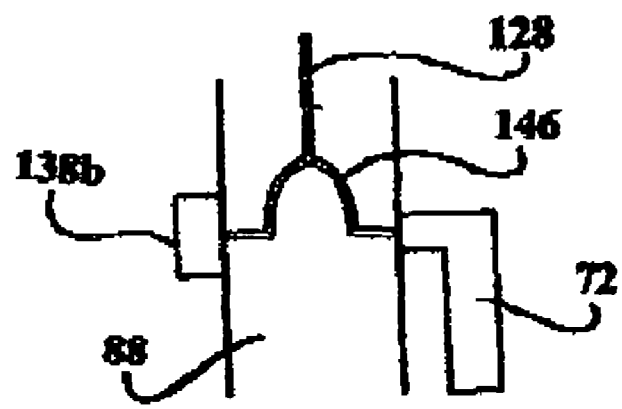
Figure 29:
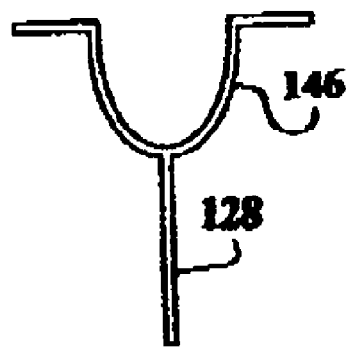
Figure 30:
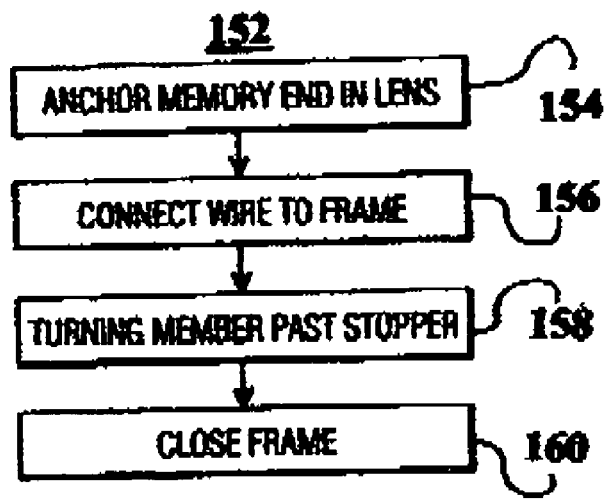
FIG. 30 is a flowchart showing steps of a method embodiment of the invention.

As seen in FIGS. 26 and 27, the connector wire 146 can be inserted into the containment structure 88 in a generally perpendicular manner to the lengthwise edges of the containment structure. For added support, the connector wire 146 could be inserted at a point between the nosepiece 72, if the containment structure includes a nosepiece, and the second latching member 138b. The anchor end 148 is attached to a portion of the peripheral edge 98 of the lens 20. As illustrated in FIG. 28, the peripheral edge 98 of the lens could have an anchor cut-out portion 150, into which the anchor insert 148a could be inserted. It is to be noted, however, that the anchor end could be attached to the lens in any number of ways that are currently known or to be discovered, such as, but not limited to, gluing, molding, heat sealing, tacking, and the like.

Optionally, the anchor insert 148a could be wider than the peripheral edge 98 of the lens, whereby the memory end could also function as the turning member.

The invention also includes embodiments which are of the lens 20 itself. One embodiment is an eyeglass lens 20 that has at least one rotator 90. The rotatator can be a turning member 90a, as seen in FIGS. 1-3, 12-13, 21-23 and 27. As seen in FIGS. 15A-16 the lens 20 can further have a peripheral member 112 and a peripheral edge 98, the peripheral member 112 engages the peripheral edge 98, and the turning member 90a is attached to the peripheral member 112. As seen in FIGS. 21-24 and 27 and 28, the lens 20 can further have at least one memory member 128. As seen in FIG. 28, the lens 20 can also have an anchor cutout 150 into which an anchor insert 148a attached to a memory member 128 can be inserted.

A method 152 of assembling this embodiment of the eyewear system includes the steps of: anchoring the anchor end, or memory end, in the lens 154; connecting the wire to the containment structure, or frame 156; and turning the turning member past the stop member 158. In addition, the step of closing the containment structure or frame 160 could be added to the method.

The way in which the containment structure could be closed depends on the type of containment structure used. By way of example and not intending to be exhausted, if the containment structure were a frame with a wire rim, the pieces of the rim could be placed around the peripheral edge of the lens, and then attached. As known in the art, wire rims are generally attached by the use of a screw in the temple region. In addition, if the frame were a plastic frame, closing the frame would incorporate the means currently known in the art or to be discovered in which the rim is attached around the lenses, such as, but not limited to, applying pressure to insert the lens in the rim, stretching and then shrinking the plastic rim around the lens, molding the rim to the lens, connecting pieces of the rim to the each other or other parts of the frame in a manner whereby at least part of the lens is surrounded by the rim.

It is to be understood that in addition to the materials described herein, the various lenses could be installed, imbedded, or inserted in eyewear that is constructed of materials including, but not limited to, metals, alloys, plastics, rubbers, silicon, wood products, or any combination of substances that would be used to hold lenses onto headwear.

While preferred dimensions of the various portions of the preferred embodiments of the eyewear have been provided, it is to be understood that these dimensions, while preferred in the preferred embodiments, are discretionary, as the eyewear can be made of varying sizes to adapt to various wearers, uses, materials, and the like.

Although the invention has been illustrated by reference to specific embodiments, it will be apparent, to those of ordinary skill in the art that various changes and modifications may be made which clearly fall within the scope of the invention. The invention is intended to be protected broadly within the spirit and scope of the appended claims.

What is claimed is:

1. An eyewear system comprising at least one rotator wherein rotator comprised of a turning member; said eyewear system further comprising at one memory member.

2. A configurable eyewear system comprising at least one containment structure and at least one lens, at least one lens rotatable within said containment structure, said eyewear system further comprising at least one rotator, said at least one lens being rotatable at least by said rotator; said eyewear system further comprising at least one memory member, wherein said eyewear system is in a group of headwear consisting of welder's eyewear, motorcycle rider eyewear, safety eyewear, skydiving eyewear, airplane pilot eyewear, gas mask eyewear, hazardous materials eyewear, 3-d glasses, costumes, masks, goggles, hoods, UV tanning eyewear, racecar driver eyewear, astronaut eyewear, sports eyewear, hoods and helmets.

3. A configurable eyewear system, said eyewear system comprising at least one containment structure and at least one lens, said at least one lens being rotatable within said containment structure, said eyewear system further comprising at least one rotator, said at least one lens being rotatable at least by said rotator, said eyewear system further comprising at least one memory member, said lens being rotatable at least by said memory member.

4. The configurable eyewear system of claim 3, said lens further comprising an anchor cut-out said memory member being attached to said lens at said anchor cut-out.

5. The configurable eyewear system of claim 3, wherein said memory member is attachable to said lens, said memory member being able to be in a resting configuration and in at least one stretched configuration, said at least one lens having an at rest position and at least one rotated position, said at least one lens being automatically rotatable from said at least one rotated position toward said at rest position when said memory member transforms from said at least one stretched configuration toward said resting configuration.

6. The configurable eyewear system of claim 5, said eyewear system further comprising at least one latch, said at least one latch being latchable when said at least one lens is in said at least one rotated position, wherein when said at least one latch is latched, said lens is in a fixed position, and wherein said at least one lens is automatically rotatable from said fixed rotated position to said resting position when said latch is unlatched from having been latched.

7. A configurable eyewear system, said eyewear system comprising at least one containment structure and at least one lens, said at least one lens being rotatable within said containment structure, said eyewear system further comprising at least one memory member, said lens being rotatable at least by said memory member.

8. The configurable eyewear system of claim 7, said memory member further comprising at least one connector, said connector connecting said memory member to said containment structure.

9. The configurable eyewear system of claim 8, said connector comprised of a wire insert.

10. The configurable eyewear system of claim 7, said memory member further comprising at least one connector, said connector connecting said memory member to said lens.

11. The configurable eyewear system of claim 10, said connector comprised of gluing said memory member to said lens.

12. The configurable eyewear system of claim 10, said connector comprised of molding said memory member to said lens.

13. The configurable eyewear system of claim 10, said connector comprised of heat sealing said memory member to said lens.

14. The configurable eyewear system of claim 10, said connector comprised of tacking said memory member to said lens.

15. The configurable eyewear system of claim 10, said connector comprising an anchor insert.

16. The configurable eyewear system of claim 15, said system further comprising a turning member, wherein said turning member is comprised of said anchor insert.

17. A memory member, said memory member being attachable to eyewear having a lens whereby said memory member is able to cause said lens to rotate.

18. The memory member of claim 17, said memory member further comprising an anchor end.

19. A configurable eyewear system, said eyewear system comprising at least one containment structure and at least one lens, said at least one lens being rotatable within said containment structure, said eyewear system further comprising one turning member, said at least one lens being rotatable at least by said turning member, said system further comprising at least one peripheral member, said turning member being attached to said peripheral member, and wherein said at least one lens further comprises a peripheral edge, said peripheral edge having at least one mating member, said at least one peripheral member having at least one mating member, said peripheral mating member engaging said peripheral edge mating member, said eyewear system further comprising at least one memory member, wherein said peripheral member has a first end and a second end, said first end having a first projection member and said second end having a second projection member, said first and second projection members meeting when said peripheral member encircles said peripheral edge of said lens, and wherein said turning member is comprised of said first and second projection members.

* * * * *